United States Patent
Stepp et al.

(10) Patent No.: US 6,998,437 B2
(45) Date of Patent: Feb. 14, 2006

(54) PREPARATION OF POLYDIORGANOSILOXANES

(75) Inventors: Michael Stepp, Burghausen (DE); Wolfgang Keller, Mehring (DE)

(73) Assignee: Wacker-Chemie GmbH, Munich (DE)

( * ) Notice: Subject to any disclaimer, the term of this patent is extended or adjusted under 35 U.S.C. 154(b) by 228 days.

(21) Appl. No.: 10/447,731

(22) Filed: May 29, 2003

(65) Prior Publication Data

US 2003/0229193 A1 Dec. 11, 2003

(30) Foreign Application Priority Data

Jun. 6, 2002 (DE) ............................... 102 25 231

(51) Int. Cl.
C08L 83/04 (2006.01)
C08G 77/08 (2006.01)

(52) U.S. Cl. .................... 524/860; 524/858; 528/12; 528/14; 528/29

(58) Field of Classification Search ................ 528/12, 528/14, 29; 524/858, 860
See application file for complete search history.

(56) References Cited

U.S. PATENT DOCUMENTS

| 2,634,252 A | | 4/1953 | Warrick |
| 2,744,923 A | * | 5/1956 | Duane .................. 556/450 |
| 3,146,251 A | | 8/1964 | Brown et al. |
| 3,445,426 A | | 5/1969 | Lee |
| 3,481,898 A | | 12/1969 | Davies |
| 3,799,962 A | | 3/1974 | Lewis |
| 4,113,690 A | | 9/1978 | Lewis |
| 5,329,034 A | * | 7/1994 | Nagase et al. .............. 556/415 |
| 5,624,680 A | * | 4/1997 | Nagase et al. .............. 424/448 |
| 6,037,486 A | * | 3/2000 | Razzano .................. 556/460 |
| 6,790,451 B2 | * | 9/2004 | Nakanishi ................... 424/401 |

FOREIGN PATENT DOCUMENTS

| DE | 1 770 140 | 7/1970 |
| DE | 42 34 959 | 4/1994 |
| EP | 0 362 710 | 4/1990 |
| EP | 0 503 825 | 3/1992 |
| EP | 0 860 459 | 8/1998 |

OTHER PUBLICATIONS

Chemisches Zentralblatt, 1955, p. 6868 corresponding to U.S. Pat. No. 2,634,252 (Na. K).
"Hochmolekularbericht" 1981; Rep. H. 10764181 corresponding to DE 30 27 155 (K, Cs).
English Abstract corresponding to DE 3 022 155 and "Hochmolekularbericht 1981.".
Chemical Abstracts, 1993, Ref. 118: 82140 n.
"Hochmolekularbericht 1959," Ref. H. 3584/59 corresponding to U.S. Pat. No. 2,866,760.
CAPIUS Abstract corresponding to U.S. Pat. No. 2,866,760 and corresponding to "Hochmolekularbericht 1959".
"Chemisches Zentralblatt 1960," pp. 17467 (Ung. 2, Chem. 1960, vol. 66, pp. 70-73).
English Abstract corresponding to "Chemisches Zentralblatt 1960".
English Derwent Abstract AN 1994—102610[13] corresponding to DE 42 34 959 C1.

* cited by examiner

Primary Examiner—Jeffrey B. Robertson
(74) Attorney, Agent, or Firm—Brooks Kushman P.C.

(57) ABSTRACT

Polydiorganosiloxanes of the general formula $$R^1-(OSiR_2)_n OH \quad (I)$$

are prepared by reacting hexaorganocyclotrisiloxanes of the formula $$(R_2SiO)_3 \quad (II)$$

with alcohols of the formula $$R^1-OH \quad (III)$$

where each R is the same or different and is a monovalent, optionally substituted hydrocarbon radical,
$R^1$ is a monovalent, optionally substituted hydrocarbon radical and
n is an integer of at least 3,
in the presence of a carbonate salt as a catalyst.

20 Claims, No Drawings

PREPARATION OF POLYDIORGANOSILOXANES

BACKGROUND OF THE INVENTION

1. Field of the Invention

The invention relates to a process for preparing polydiorganosiloxanes, each of which has an Si-bonded hydroxyl group at one terminus and an Si-bonded, optionally substituted, alkoxy group at the other terminus.

2. Background Art

DE-C 42 34 959 (Th. Goldschmidt AG) describes the ring-opening polymerization of hexamethylcyclotrisiloxane with lithium alkoxide and termination of the reaction using a chloro-, bromo-, or acyloxysilane. From a safety point of view, the preparation of lithium alkoxide from the appropriate alcohol with metallic lithium is problematic, as is the use of ethers as solvents for the alkoxide: such ethers are prone to generation of involatile peroxides. Furthermore, the handling of lithium alkoxide is costly and inconvenient owing to its sensitivity to hydrolysis.

U.S. Pat. No. 3,445,426 (Dow Corning Corporation) discloses the polymerization of hexaorganocyclotrisiloxane in the presence of catalytic amounts of a penta-coordinated silicon catalyst or alkali metal silicate, ammonium silicate or phosphonium silicate. However, the catalysts have the disadvantage that they are costly and inconvenient to prepare and very moisture-sensitive. The initiator specified for the ring-opening polymerization is alcohol in combination with water, which always leads to polymer mixtures, i.e. OH-terminated polymers and monoalkoxy-terminated polymers.

SUMMARY OF THE INVENTION

The present invention provides a process for preparing hydroxyl and alkoxy-terminated polydiorganosiloxanes which avoids the above-mentioned disadvantages and allows use of insensitive, easily accessible catalysts and very small amounts of solvent, thus presenting few safety problems.

DETAILED DESCRIPTION OF THE PREFERRED EMBODIMENTS

The invention provides a process for preparing polydiorganosiloxanes of the general formula $$R^1-(OSiR_2)_n OH \quad (I)$$

by reacting hexaorganocyclotrisiloxanes of the formula $$(R_2SiO)_3 \quad (II)$$

with alcohols of the formula $$R^1-OH \quad (III)$$

where each R is the same or different and is a monovalent, optionally substituted hydrocarbon radical,
  $R^1$ is a monovalent, optionally substituted hydrocarbon radical and
  n is an integer of at least 3, in the presence of a catalyst comprising a carbonate salt.

Each R is preferably a monovalent, optionally substituted hydrocarbon radical having from 1 to 18 carbon atom(s) per radical, and each $R^1$ likewise is preferably a monovalent, optionally substituted hydrocarbon radical having from 1 to 18 carbon atom(s). Preferably, n is an integer from 3 to 999, more preferably from 6 to 200, and most preferably from 9 to 100.

Examples of hydrocarbon radicals R include alkyl radicals such as the methyl, ethyl, n-propyl, isopropyl, n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl, allyl, 5-hexenyl and 10-undecenyl radicals; cycloalkyl radicals such as cyclopentyl, cyclohexyl, cycloheptyl and methylcyclohexyl radicals; aryl radicals such as the phenyl and the naphthyl radicals; alkaryl radicals such as the o-, m- and p-tolyl radicals, xylyl radicals and ethylphenyl radicals; aralkyl radicals such as the benzyl radical, and the α- and β-phenylethyl radicals.

R radicals may be monovalent substituted hydrocarbon radicals having from 1 to 18 carbon atoms per radical. Substituted hydrocarbon radicals R are preferably halogenated hydrocarbon radicals and hydrocarbon radicals which contain one or more non-adjacent oxygen atoms. The oxygen atoms are preferably joined via alkylene bridges.

Examples of substituted hydrocarbon radicals R include haloalkyl radicals such as the 3-chloropropyl radical, the 3,3,3-trifluoro-n-propyl radical, the 2,2,2,2',2',2'-hexafluoroisopropyl radical, the heptafluoroisopropyl radical; haloaryl radicals such as the o-, m- and p-chlorophenyl radicals; and acyloxyalkyl radicals such as the acetoxyethyl radical and (meth)acryloxypropyl radical.

Examples of hydrocarbon radicals $R^1$ include alkyl radicals such as the methyl, ethyl, n-propyl, isopropyl, n-butyl, isobutyl, tert-butyl, n-pentyl, isopentyl, neopentyl and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the allyl, 5-hexenyl and 10-undecenyl radical; cycloalkyl radicals such as the cyclopentyl, cyclohexyl, cycloheptyl and methylcyclohexyl radicals; and aralkyl radicals such as the benzyl radical and the α- and β-phenylethyl radicals.

$R^1$ radicals may be monovalent substituted hydrocarbon radicals having from 1 to 18 carbon atoms per radical. Substituted hydrocarbon radicals $R^1$ are preferably monovalent hydrocarbon radicals which contain one or more non-adjacent heteroatoms selected from among oxygen, sulfur, nitrogen, phosphorus and silicon, and are preferably members of the compound classes of carboxylic acid derivatives, phosphoric acid derivatives, thiol derivatives, amino derivatives, nitrile derivatives, siloxy derivatives and (poly)ether derivatives.

Examples of substituted hydrocarbon radicals $R^1$ include haloalkyl radicals such as the 3,3,3-trifluoro-n-propyl radical, the 2,2,2,2',2',2'-hexafluoroisopropyl radical, the heptafluoroisopropyl radical; silylalkyl radicals such as the trimethylsilylmethyl radical; acyloxyalkyl radicals such as the 2-acryloxyethyl radical, the 3-methacryloxypropyl radical or the 2-(2-acryloxyethoxy)ethyl radical and also oligomers with differing numbers of ethyleneoxy radicals; alkoxyalkyl radicals such as the 2-methoxyethyl radical, the 2-(2-methoxyethoxy)ethyl radical and also oligomers with differing numbers of ethyleneoxy radicals; vinyloxyalkyl radicals such as the 4-vinyloxy-1-butyl radical ($H_2C=CH-O-(CH_2)_4-$), the 4-(vinyloxymethyl)cyclohexyl-1-methyl radical ($H_2C=CH-O-CH_2-(1,4)-C_6H_{10}-CH_2-$), the 2-(2-vinyloxyethoxy)-1-ethyl radical ($H_2C=CH-O-CH_2CH_2-O-CH_2CH_2-$); hydrocarbon radicals substituted by mercapto groups —SH, such as the 2-mercapto-1-ethyl radical ($HS-CH_2CH_2-$), the 1-mercapto2-propyl radical ($HS-CH_2(H_3C)CH-$); hydrocarbon radicals substituted by cyano groups —CN, such as the 2-cyano-1-ethyl radical ($NC-(CH_2)_3-$); hydrocarbon radicals substituted by $-C(=O)$ groups, such as the 2-oxo-1-propyl radical ($H_3C-C(=O)CH_2-$); hydrocarbon radicals substituted by amino groups of the formula $-NR^2_2$ (where $R^2$ is a hydrogen atom or a $C_1-C_{10}$ hydrocarbon radical), such as the 2-N,N-dimethylamino-1-ethyl radical (($H_3C)_2N-(CH_2)_2-$), the 3-N,N-dimethylamino-1-propyl radical ($(H_3C)_2N-(CH_2)_3-$) and the 3-N,N-dimethylamino-2-propyl radical ($(H_3C)_2NCH_2(CH_3)CH-$); and also radicals having a photoinitiator function such as $-CH_2CH_2-O-p-C_6H_4-C(=O)-C(CH_3)_2-OH$ ("Irgacure 2959"); or heterocyclic radicals such as the 3,4-dihydro-2H-pyranyl-2-methyl-1 radical, the (2-furyl)-1-methyl radical, the 2-morpholino-1-ethyl radical, the 2-piperidino-1-ethyl radical, the 2-pyrrolidino-1-ethyl radical; or chiral organic radicals such as the (1R,2S)-(-)-2-dimethylamino -1-phenyl-1-propyl radical (from (–)-N-methylephedrine), the ((R)-(+)-2-furyl)-2-ethyl radical; chiral or racemic hydroxycarboxylic ester derivatives, e.g. lactic acid derivatives such as: L-(-) $H_3C-(CH_2)_3-OOC-(H_3C)HC-$, L-(-) $H_3C-CH_2-OOC-(H_3C)HC-$, or D-(+) $(H_3C)_3C-OOC-(H_3C)HC-$; polyether radicals such as those of the general formula: $H^2C=CR^2-C_mH_{2m}-[(OC_2H_4)_x(OC_3H_6)_y(OC_4H_8)_z]$-(random or block distribution) where $R^2$ is a hydrogen atom or an alkyl radical, m, x, y and z are each 0 or an integer (where x+y+z>0), with the proviso that the corresponding alcohol of the formula (III) which is used in the process according to the invention is still liquid at 40° C., and x, y and z are preferably each 0 or an integer from 1 to 20, R is preferably a hydrogen atom or a methyl radical and m is preferably 0 or an integer from 1 to 9; $H^2C=CR^2-CO[(OC_2H_4)_x(OC_3H_6)_y]$-(random or block distribution) where $R^2$ is a hydrogen atom or an alkyl radical, x and y are each 0 or an integer (where x+y>0), with the proviso that the corresponding alcohol of the formula (III) which is used in the process according to the invention is still liquid at 40° C., and x and y are preferably each 0 or an integer from 1 to 20; $R^3-[(OC_2H_4)_x(OC_3H_6)_y(OC_4H_8)_z]$-(random or block distribution) where $R^3$ is an alkyl or acyl radical, preferably a $C_1-C_4$-alkyl radical or acetyl radical, x, y and z are each 0 or an integer (where x+y+z>0), with the proviso that the corresponding alcohol of the formula (III) which is used in the process according to the invention is still liquid at 40° C., and x, y and z are preferably each 0 or an integer from 1 to 20.

R is preferably an alkyl radical, more preferably a methyl radical, and $R^1$ is preferably an alkyl radical, alkenyl radical or substituted hydrocarbon radical, more preferably an ethyl, n-propyl, isopropyl, n-butyl or isobutyl radical.

Examples of organo(poly)siloxanes according to the invention are those of the formula:
$(H_3C)_2CH-CH_2-(OSiMe_2)_n-OH$,
$H_3C-(CH_2)_2-(OSiMe_2)_n-OH$,
$(H_3C)_2CH-(OSiMe_2)_n-OH$,
$H_3C-CH_2-(OSiMe_2)_n-OH$,
$H_3C-(OSiMe_2)_n-OH$,
$H_2C=CH-CH_2-(OSiMe_2)_n-OH$,
$H_2C=CH-(CH_2)_9-(OSiMe_2)_n-OH$,
$H_2C=CH-C(O)O-CH_2-CH_2-(OSiMe_2)_n-OH$,
$H_2C=CH-C(O)-(OC_2H_4)_2-(OSiMe_2)_n-OH$,
$(H_3C)_3Si-CH_2-(OSiMe_2)_n-OH$,
L—(-)$H_3C-CH_2-OOC-(H_3C)HC-(OSiMe_2)_n-OH$,
$H_2C=CH-O-(CH_2)_4-(OSiMe_2)_n-OH$,
$H_3C-C(=O)CH_2-(OSiMe_2)_n-OH$,
$(H_3C)_2N-(CH_2)_2-(OSiMe_2)_n-OH$,
$CH_2=CHCH_2-[(OC_2H_4)_{20}(OC_3H_6)_{20}]-[OSi(CH_3)_2]_n-OH$, and
$HS-CH_2CH_2-(OSiMe_2)_n-OH$,
where Me is a methyl radical and n is as defined above.

The organo(poly)siloxanes according to the invention preferably have a viscosity of from 4 mPa·s to 9×10⁵ mPa·s at 25° C.

Examples of hexaorganocyclotrisiloxanes (II) used in the inventive process are hexamethylcyclotrisiloxane, hexaethylcyclotrisiloxane, 1,3,5-trimethyl-1,3,5-triethylcyclo-2,4,6-trisiloxane and 1,3,5-trimethyl-1,3,5-tris(3,3,3-trifluoropropyl)cyclo-2,4,6-trisiloxane. The hexaorganocyclotrisiloxane (II) is preferably hexamethylcyclotrisiloxane (referred to hereinbelow as "D3").

The catalyst used in the process according to the invention is preferably a carbonate salt on a support material, more preferably an alkali metal carbonate, or an alkali metal carbonate bonded on support material. The catalyst used may be either a single type or a mixture of at least two different types of such catalysts.

Examples of alkali metal carbonates include potassium carbonate and cesium carbonate, preference being given to potassium carbonate.

Examples of support materials include aluminum oxides, titanium dioxides, zirconium oxides, zeolites, silica gels, diatomaceous earth and ion exchange resins, preference being given to aluminum oxides.

Particular preference is given to using potassium carbonate, especially potassium carbonate on an aluminum oxide support.

Potassium carbonate "bonded" to a support material is prepared, for example, by evaporating a mixture of aluminum oxide and potassium carbonate in water, by drying a mixture of aluminum oxide and potassium carbonate triturated together, or by hydrolyzing aluminum triisopropoxide, zirconium tetraisopropoxide or titanium tetraisopropoxide in the presence of potassium carbonate.

The subject invention process has the advantage that the catalyst used is easily obtainable and simple to handle under air. The preparation of the organo(poly)siloxanes with the catalyst, i.e. under heterogeneous catalysis, has the further advantage that the catalyst, being solid, can be easily removed from the reaction mixture, for example by simple filtration.

In the inventive process, the catalyst is preferably used in amounts of 0.01–1% by weight, more preferably from 0.1 to 0.5% by weight based on the total amount of the hexaorganocyclotrisiloxane used.

The alkoxy group at one organo(poly)siloxane molecular terminus is introduced via the alcohol (III) used. Preference is given to using ethanol, n-propanol, isopropanol, n-butanol or isobutanol.

The ratio of hexaorganocyclotrisiloxane (II) to alcohol (III) used determines the average chain length of the product. Owing to kinetic effects, to achieve a specified average chain length, it may be in some cases be necessary to depart from the theoretical stoichiometry in the ratio of hexaorganocyclotrisiloxane to alcohol and to use an excess of hexaorganocyclotrisiloxane or alcohol. The optimum ratio may be determined by preliminary experiments. Hexaorganocyclotrisiloxane (II) is preferably used in amounts of from 0.1 to 333 mol, more preferably in amounts from 0.1 to 10 mol, in each case based on 1 mol of alcohol (III).

To increase the selectivity of the reaction, the process according to the invention may be carried out in the presence of polar, aprotic organic solvents, optionally in a mixture with a nonpolar solvent. Examples of polar, aprotic organic solvents include acetone, methyl isobutyl ketone (MIBK), methyl ethyl ketone (MEK), dimethylformamide, dimethyl sulfoxide, acetonitrile, tetrahydrofuran, diethyl ether, dibutyl ether, methyl t-butyl ether, diethylene glycol dimethyl ether, polyethylene glycol dimethyl ether, n-butyl acetate and ethyl acetate. Examples of nonpolar solvents include toluene, xylene, cyclohexane, methylcyclohexane, heptane and siloxanes such as octamethylcyclotetrasiloxane, decamethylcyclopentasiloxane, hexamethyldisiloxane or octamethyltrisiloxane.

Depending on the type of the catalyst comprising carbonate ions, polar, aprotic organic solvent(s) are preferably used in amounts of 0–50% by weight, more preferably from 5 to 30% by weight, most preferably from 5 to 20% by weight, in each case based on the total weight of alcohol and hexaorganocyclotrisiloxane. For better homogenization of the reaction mixture, nonpolar organic solvents may be used in amounts of from 0 to 80% by weight, preferably from 50 to 70 % by weight, in each case based on the total weight of alcohol and hexaorganocyclotrisiloxane.

To increase the selectivity and/or rate of the reaction, mixtures of different solvents may be used.

After the end of the reaction, the solvent is generally removed by distillation. However, if the polysiloxane product is to be further processed in solution, removal of the solvent may be dispensed with. Depending on the end use anticipated, it is also possible to use high-boiling liquids such as polydimethylsiloxanes which cannot be removed distillatively as solvents.

To increase the selectivity and/or rate of the reaction, phase transfer catalysts, for example quaternary ammonium salts such as benzyltriethylammonium chloride, crown ethers such as 18-crown-6, 1,4,7,10,13-hexaoxacyclooctadecane, polyethylene glycol dimethyl ether, or tertiary amines such as 4-dimethylaminopyridine, N,N-dimethylcyclohexylamine or 1,4-diazabicyclo[2.2.2]octane, may be used.

To exclude traces of moisture, it may be advantageous to also use drying agents such as zeolites, anhydrous sodium sulfate or anhydrous magnesium sulfate in the process.

The process is preferably carried out at a temperature which is above the melting temperature of the reaction partners used, more preferably at a temperature of from 60° C. to 80° C., although it may also be carried out at lower temperatures when solvents are used. The process is preferably carried out at the pressure of the surrounding atmosphere, i.e. at approximately 1020 hPa (abs.), although it is also possible to use higher or lower pressures.

Depending on the reaction temperature, the type and amount of the reaction partners, and the solvents used, the reaction time is preferably from 0.25 to 48 hours. It is possible to terminate the reaction at incomplete conversion by cooling to room temperature and/or filtering. It is also possible to terminate the reaction by adding an acid, for example acetic acid, formic acid, 2-ethylhexanoic acid or phosphoric acid.

Preparation of the Catalyst:

10.1 g (0.1 mol) of aluminum oxide (obtained from Merck) are mixed with 6.9 g (0.1 mol) of anhydrous potassium carbonate (obtained from Merck), ground, and heated at 200° C. for 24 hours. The powder is stored in a closed glass vessel.

EXAMPLE 1

A mixture of 222 g (1 mol) of hexamethylcyclotrisiloxane, 96.2 g (1.6 mol) of 2-propanol p.a. (obtained from Merck), and 20 g of 0.4 nm molecular sieves (obtained from Merck) is heated to 60° C. and admixed with a suspension of 1 g of catalyst (whose preparation is described above) in 46.4 g (0.8 mol) of acetone p.a. (obtained from Merck). The mixture is stirred at 60° C. for 4 hours and filtered through silica gel 60 (obtained from Merck), and the filtrate is concentrated on a rotary evaporator at 40° C. and 5 mbar. 241.6 g of a clear, colorless oil are obtained which, according to the results of the $^{29}$Si NMR spectrum and the MALDI-TOF mass spectrum, corresponds to a silicone of the following average formula:

$(CH_3)_2CH—[OSi(CH_3)_2]_{44}—OH.$

EXAMPLE 2

A mixture of 222 g (1 mol) of hexamethylcyclotrisiloxane, 36.8 g (0.8 mol) of ethanol (obtained from Merck), and 20 g of 0.4 nm molecular sieves (obtained from Merck) is heated to 50° C. and admixed with a suspension of 1 g of catalyst (whose preparation is described above) and 0.3 g (0.0013 mol) of benzyltriethylammonium chloride (obtained from Merck) in 56.4 g (0.6 mol) of dimethyl sulfoxide (obtained from Merck). The mixture is stirred at 50° C. for four hours and filtered through silica gel 60 (obtained from Merck), the filtrate is concentrated on a rotary evaporator at 50° C. and 5 mbar, and the separated dimethyl sulfoxide is removed using a separating funnel. 234 g of a clear, colorless oil are obtained which, according to the results of the $^{29}$Si—NMR spectrum and the MALDI-TOF mass spectrum, corresponds to a silicone of the following average formula:

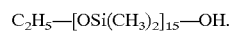

$C_2H_5—[OSi(CH_3)_2]_{15}—OH.$

EXAMPLE 3

A mixture of 111 g (0.5 mol) of hexamethylcyclotrisiloxane and 26 g (0.2 mol) of 2-hydroxyethyl methacrylate (obtained from Merck) is heated to 50° C. and admixed with a suspension of 0.5 g of catalyst (whose preparation is described above) in 23.2 g (0.4 mol) of acetone p.a. (obtained from Merck). The mixture is stirred at 50° C. for 120 minutes, filtered through silica gel 60 (obtained from Merck), and the filtrate concentrated on a rotary evaporator at 100° C. and 5 mbar. 121 g of a clear colorless oil are obtained which, according to the $^{29}$Si—NMR spectrum, corresponds to a silicone of the following average formula:

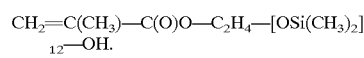

$CH_2=C(CH_3)—C(O)O—C_2H_4—[OSi(CH_3)_2]_{12}—OH.$

EXAMPLE 4

A mixture of 111 g (0.5 mol) of hexamethylcyclotrisiloxane, 23.2 g (0.4 mol) of allyl alcohol (obtained from Merck), and 88.8 g (0.3 mol) of octamethylcyclotetrasiloxane is heated to 80° C. and admixed with a suspension of 0.5 g of catalyst (whose preparation is described above) in 23.2 g (0.4 mol) of acetone p.a. (obtained from Merck). The mixture is stirred at 80° C. for 5 hours, filtered through silica gel 60 (obtained from Merck), and the filtrate concentrated on a rotary evaporator at 60° C. and 5 mbar. 118 g of an oil are obtained which, according to the results of the $^{29}$Si—NMR spectrum and the MALDI-TOF mass spectrum, corresponds to a silicone of the following average formula:

$$CH_2=CHCH_2-[OSi(CH_3)_2]_{14}-OH.$$

EXAMPLE 5

A mixture of 111 g (0.5 mol) of hexamethylcyclotrisiloxane and 29.6 g (0.4 mol) of 2-methyl-1-propanol (obtained from Merck) is heated to 60° C. and admixed with a suspension of 0.5 g of anhydrous potassium carbonate (obtained from Merck) in 23.2 g (0.4 mol) of acetone p.a. (obtained from Merck). The mixture is stirred at 60° C. for 120 minutes, filtered through silica gel 60 (obtained from Merck), and the filtrate concentrated on a rotary evaporator at 40° C. and 5 mbar. 124 g of a clear, colorless oil are obtained which, according to the results of the $^{29}$Si—NMR spectrum and the MALDI-TOF mass spectrum, corresponds to a silicone oil of the following average formula:

$$(CH_3)_2CHCH_2-[OSi(CH_3)_2]_{22}-OH.$$

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for preparing polydiorganosiloxanes of the formula $$R^1-(OSiR_2)_n OH \qquad (I),$$

comprising reacting at least one hexaorganocyclotrisiloxane of the formula $$(R_2SiO)_3 \qquad (II)$$

with at least one alcohol of the formula $$R^1-OH \qquad (III)$$

where each R is the same or different and is a monovalent, optionally substituted hydrocarbon radical,
  $R^1$ is a monovalent, optionally substituted hydrocarbon radical and
  n is an integer of at least 3,
  in the presence of a catalyst comprising a carbonate salt, and
  wherein the reaction is effected in the presence of a polar, aprotic, organic solvent.

2. A process for preparing polydiorganosiloxanes of the formula $$R^1-(OSiR_2)_n OH \qquad (I),$$

comprising reacting at least one hexaorganocyclotrisiloxane of the formula $$(R_2SiO)_3 \qquad (II)$$

with at least one alcohol of the formula $$R^1-OH \qquad (III)$$

where each R is the same or different and is a monovalent, optionally substituted hydrocarbon radical,
  $R^1$ is a monovalent, optionally substituted hydrocarbon radical and
  n is an integer of at least 3,
  in the presence of a catalyst comprising a carbonate salt on a support material.

3. The process of claim 1, wherein the catalyst comprises a carbonate salt on a support material.

4. The process of claim 1, wherein the catalyst comprises an alkali metal carbonate.

5. The process of claim 2, wherein the catalyst comprises an alkali metal carbonate on a support material.

6. The process of claim 1, wherein the catalyst comprises potassium carbonate.

7. The process of claim 1, wherein the catalyst comprises potassium carbonate on a support material.

8. The process of claim 1, wherein the catalyst comprises potassium carbonate on aluminum oxide.

9. A process for preparing polydiorganosiloxanes of the formula $$R^1-(OSiR_2)_n OH \qquad (I),$$

comprising reacting at least one hexaorganocyclotrisiloxane of the formula $$(R_2SiO)_3 \qquad (II)$$

with at least one alcohol of the formula $$R^1-OH \qquad (III)$$

where each R is the same or different and is a monovalent, optionally substituted hydrocarbon radical,
  $R^1$ is a monovalent, optionally substituted hydrocarbon radical and
  n is an integer of at least 3,
  in the presence of a catalyst comprising a carbonate salt,
  wherein a nonpolar organic solvent is present.

10. The process of claim 1, wherein a nonpolar organic solvent is present.

11. The process of claim 1, wherein hexaorganocyclotrisiloxane (II) is used in amounts of from 0.1 to 333 mol per mole of alcohol (III).

12. The process of claim 1, wherein the carbonate salt is present in amounts of from 0.01 to 1% by weight based on the total weight of hexaorganocyclotrisiloxane (II).

13. The process of claim 1, wherein the hexaorganocyclotrisiloxane (II) comprises hexamethylcyclotrisiloxane.

14. The process of claim 1, wherein an alcohol (III) is ethanol, n-propanol, isopropanol, n-butanol or isobutanol.

15. A process for preparing polydiorganosiloxanes of the formula $$R^1-(OSiR_2)_n OH \qquad (I),$$

comprising reacting at least one hexaorganocyclotrisiloxane of the formula $$(R_2SiO)_3 \qquad (II)$$

with at least one alcohol of the formula $$R^1-OH \qquad (III)$$

where each R is the same or different and is a monovalent, optionally substituted hydrocarbon radical,
  $R^1$ is a monovalent, optionally substituted hydrocarbon radical and
  n is an integer of at least 3,
  in the presence of a catalyst comprising a carbonate salt,
  wherein said reacting takes place in the presence of a phase transfer catalyst.

16. A process for preparing polydiorganosiloxanes of the formula $$R^1\text{—}(OSiR_2)_n OH \quad (I),$$

comprising reacting at least one hexaorganocyclotrisiloxane of the formula $$(R_2SiO)_3 \quad (II)$$

with at least one alcohol of the formula $$R^1\text{—}OH \quad (III)$$

where each R is the same or different and is a monovalent, optionally substituted hydrocarbon radical,
$R^1$ is a monovalent, optionally substituted hydrocarbon radical and
n is an integer of at least 3,
in the presence of a catalyst comprising a carbonate salt, wherein said reacting takes place in the presence of a drying agent.

17. The process of claim 1, wherein said reacting takes place in the presence of a phase transfer catalyst.

18. The process of claim 2, wherein said reacting takes place in the presence of a phase transfer catalyst.

19. The process of claim 9, wherein said reacting takes place in the presence of a phase transfer catalyst.

20. The process of claim 10, wherein said reacting takes place in the presence of a phase transfer catalyst.

* * * * *